US007491259B2

(12) United States Patent
Buchelli et al.

(10) Patent No.: US 7,491,259 B2
(45) Date of Patent: Feb. 17, 2009

(54) RESIDENCE TIME DISTRIBUTION METHOD AND APPARATUS FOR OPERATING A CURVILINEAR PRESSURE VESSEL WHERE TRANSPORT PHENOMENA TAKE PLACE

(75) Inventors: Alberto Buchelli, Houston, TX (US); William G. Todd, Victoria, TX (US)

(73) Assignee: Equistar Chemicals, LP, Houston, TX (US)

(*) Notice: Subject to any disclaimer, the term of this patent is extended or adjusted under 35 U.S.C. 154(b) by 427 days.

(21) Appl. No.: 11/430,757

(22) Filed: May 9, 2006

(65) Prior Publication Data

US 2007/0261549 A1 Nov. 15, 2007

(51) Int. Cl.
*F17C 11/00* (2006.01)
*B01J 8/02* (2006.01)

(52) U.S. Cl. .......... 95/90; 422/220

(58) Field of Classification Search .......... 95/90; 96/108, 139, 152; 422/171, 176, 177, 211, 422/220
See application file for complete search history.

(56) References Cited

U.S. PATENT DOCUMENTS 2,655,273 A * 10/1953 Snow .......... 414/301
2,980,515 A * 4/1961 Horner et al. .......... 422/211
2,996,361 A * 8/1961 Brumbaugh .......... 422/220
3,007,779 A * 11/1961 Vlachos .......... 422/220
3,320,728 A * 5/1967 Spencer et al. .......... 96/133
3,363,843 A * 1/1968 Ballard et al. .......... 239/504
3,479,146 A * 11/1969 Hochman et al. .......... 422/220
3,685,971 A 8/1972 Carson .......... 23/288
3,751,231 A * 8/1973 Niedzielski .......... 55/318
5,098,690 A * 3/1992 Koves .......... 423/659
5,160,355 A * 11/1992 Toppel .......... 96/146
5,160,513 A * 11/1992 Koves .......... 95/90
5,512,088 A * 4/1996 McKenzie .......... 96/152
5,779,773 A * 7/1998 Cam et al. .......... 96/152
5,873,929 A * 2/1999 Andreani et al. .......... 96/108
6,334,889 B1 * 1/2002 Smolarek et al. .......... 96/149
2003/0056649 A1 * 3/2003 Lee et al. .......... 95/90
2005/0155492 A1 * 7/2005 Baksh et al. .......... 96/135

FOREIGN PATENT DOCUMENTS

WO PCT/US2007/009485 12/2007

* cited by examiner

*Primary Examiner*—Frank M Lawrence
(74) *Attorney, Agent, or Firm*—Roderick W. MacDonald

(57) ABSTRACT

A method and apparatus for operating a pressure vessel containing a bed of particulate material comprising substantially leveling the bed and employing a fluid flow distributor above the bed.

5 Claims, 4 Drawing Sheets

RESIDENCE TIME DISTRIBUTION METHOD AND APPARATUS FOR OPERATING A CURVILINEAR PRESSURE VESSEL WHERE TRANSPORT PHENOMENA TAKE PLACE

BACKGROUND OF THE INVENTION

1. Field of the Invention

This invention relates to the operation of a pressure vessel and apparatus for carrying out such operation.

2. Description of the Prior Art

Although, for sake of clarity and brevity, this invention will be described in respect of the solution polymerization of ethylene, it is to be understood that this invention applies generally to curvilinear pressure vessels that operate at an elevated pressure, e.g., at least about 1,000 psig, and that contain a bed of particulate material through which a process fluid is to flow in a substantially uniform manner. For example, this invention can be applied to adsorbent beds, catalyst beds, and fixed beds such as those used in processes such as polymer formation.

Heretofore, linear high density polyethylene (HDPE) has been formed by polymerizing ethylene while dissolved in a solvent such as hexane. The resulting solvent solution also contains a polymerization catalyst such as the combination of $TiCl_4$ and $VOCl_3$. The polymerization reaction is carried out in a single liquid phase containing at least the above components using a series of stirred reactors followed by a tubular (plug flow) reactor. Downstream of the last reactor a catalyst deactivator such as acetylacetone is injected into the solution, and the resulting mixture introduced into an adsorption vessel which is a pressure vessel. In the adsorber catalyst compounds and decomposition components of the deactivator are adsorbed from the single phase solution. The polymerization reaction is carried out at an elevated temperature of from about 150 to about 280 degrees Centigrade (C.) at a pressure of from about 2,000 to about 4,000 psig. Thus, the adsorption step of this process is carried out at a very high pressure, and this requires, for sake of capital costs, an adsorber configuration that is curvilinear, typically spherical.

The adsorbent material used in this pressure vessel is typically a particulate material. These particles adsorb from the single phase liquid solution various catalyst moieties such as titanium compounds, vanadium compounds, and by-products of the decomposition of the catalyst deactivator. The adsorbent for the exemplary HDPE process above is typically activated alumina particles such as alumina spheres about 1.7 millimeters in diameter. As these particles adsorb catalyst and deactivator compounds from the single phase liquid passing through the adsorbent bed, they change in color, typically from an initially white color to varying shades of gray, to black, the darker the adsorbent particle, the greater the extent of adsorption of the aforementioned materials by that particle.

The particulate adsorbent, when initially loaded into the adsorber, is gravity poured through a nozzle opening in an upper portion of the vessel down into the interior of the vessel, and allowed to pile up therein to a predetermined level. This invariably leaves an adsorbent bed in the vessel with an uneven upper surface, typically an inverted conical surface that rises to a peak approaching, but below, the opening through which it was poured. This conical pile of particulates normally piles up at its natural angle of repose, e.g., about a 30 degree angle from the horizontal for the alumina particles used in an HDPE adsorber.

After the conical pile of adsorbant is formed in the vessel, the vessel is put into operation and the high temperature, high pressure, single phase solution aforesaid is passed into the nozzle in the vessel for contact with the adsorbent bed. This nozzle is typically an upstanding conduit whose long axis is substantially vertical. The single phase liquid solution is then passed into the nozzle at an angle that is transverse, e.g., a 90 degree angle, to the long axis of the conduit so that the solution must make a sharp turn downward in order to enter the interior of the vessel where the adsorbent bed lies.

In the exemplary HDPE process, as with many other processes, a conventional plug flow reactor is employed upstream of the adsorber to accomplish product uniformity with a uniform residence time distribution for the reactants in that reactor. By "plug flow," what is meant is substantially uniform fluid velocity distribution across a transverse cross-section of a reactor, and maintenance of that flow as that fluid passes longitudinally through the reactor from its entrance to its exit. This gives all portions of that process fluid essentially uniform residence time in the reactor. This same plug flow concept can be applied to other vessels, including, but not limited to, adsorbent vessels.

The curvilinear shape of a high pressure adsorber, the conical shape of the adsorbent bed in the adsorber, and the right angle turn the single phase solution must make after it enters the nozzle of the adsorber, all work against achieving anything like plug flow of the solution through the adsorbent bed. This causes mal-distribution of solution as it passes to and through the bed, which results in channeling of solution through localized portions of the bed. This channeling causes underutilization of the adsorbent throughout substantial volumes of that bed, while other portions, where the channeling occurs, are forced to treat too much solution. The result of channeling can be seen in a used alumina bed height profile wherein some portions (groups) of alumina particles are black, while other groups are still white, indicating no adsorption at all.

The HDPE process must be carried out in a single phase solution. If two phases (a polymer rich phase and a solution rich phase) were allowed to form, a phenomenon known in the art as "frosting" or "two-phasing" occurs wherein solid polymer forms in the interior of the reactors and adsorbers, and deposits there. Process conditions such as temperature, pressure, and mass composition of the single phase solution stream can determine whether the stream will stay in the single phase or move toward two-phasing. If two-phasing is allowed to continue unchecked, the vessels in which it is occurring will eventually plug up with solid polyethylene thereby requiring shut down of the plant, and clean up of at least the affected vessels, a costly event in terms of lost production and clean-up costs.

Mal-distribution of single phase solution flow through an adsorber bed can cause two-phasing and polymer deposition in the bed due to an undesired change in pressure where the solution channels through the bed. This can lead to plugging of at least sections of the bed, up to, and including, the entire bed if left unchecked. This then necessitates a premature and costly shut down of the adsorber and replacement of the bed with fresh adsorbent.

Thus, it is highly desirable to operate an HDPE adsorber in a manner that more closely approaches plug flow through the particulate bed. This invention does just that by attacking both the distribution of the process fluid over the bed, and the configuration of the uneven, upper surface of the bed itself.

This premise applies as well to other bed containing pressure vessels such as catalyst containing vessels, and the like.

SUMMARY OF THE INVENTION

Pursuant to this invention, plug flow of a process fluid through a bed in a pressure vessel is more closely approached by the combination of substantially flattening the upper surface of the bed, and employing a flow distributor in the vicinity where the process fluid enters the vessel.

DETAILED DESCRIPTION OF THE INVENTION

Figure 1:
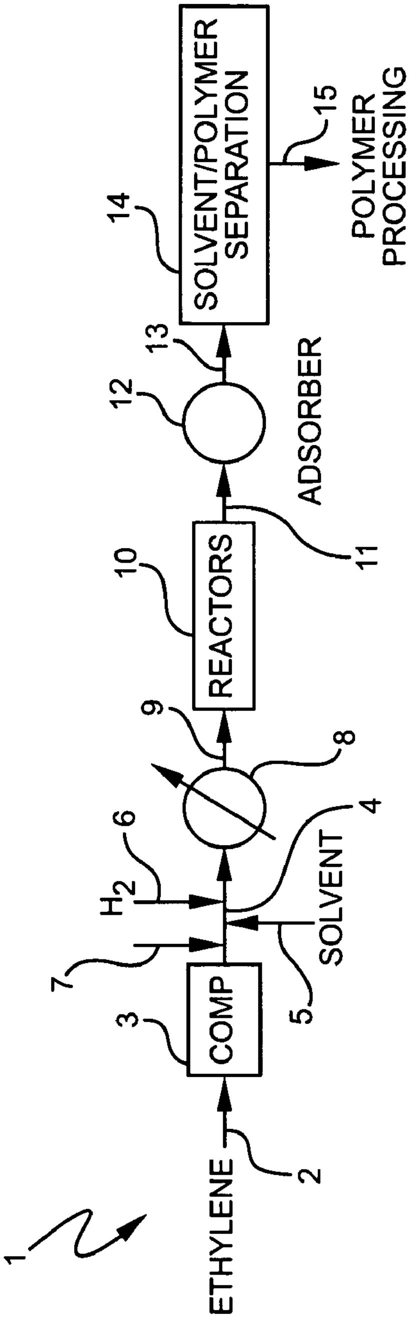
FIG. 1 (Prior Art)
FIG. 1 shows a flow sheet for the HDPE process aforesaid.

FIG. 1 shows an ethylene polymerization process 1 wherein an ethylene monomer stream 2 is compressed at 3 and the compressed product removed into line 4. Solvent 5 and molecular hydrogen 6 are added to stream 4. One or more co-monomers 7 can also be added to this stream, if desired. Stream 4 is then heated by heat exchanger 8 to form the desired single phase solution, which is then conducted via line 9 to reactor unit 10. Unit 10 conventionally contains two continuous, stirred reactors (not shown) working in parallel and both feeding a single, continuous, stirred reactor (not shown), which, in turn, feeds a tubular reactor (not shown).

The single phase solution product containing polyethylene formed in reactor unit 10 is passed by way of line 11 to adsorber unit 12. Acetylacetone is injected (see FIG. 2) upstream of adsorber 12. The single phase solution minus the catalyst and deactivator materials adsorbed by the alumina bed of unit 12 is passed by way of line 13 to a solvent/polymer separation unit 14, from which is recovered a polymer product 15 that is then sent on for other processing such as extruding and melt cutting. In unit 14 the single phase solution is depressurized in steps to cause two-phasing so that unreacted monomer and solvent can be recovered for return to the polymerization process (not shown) up stream of reactor unit 10.

Figure 2:
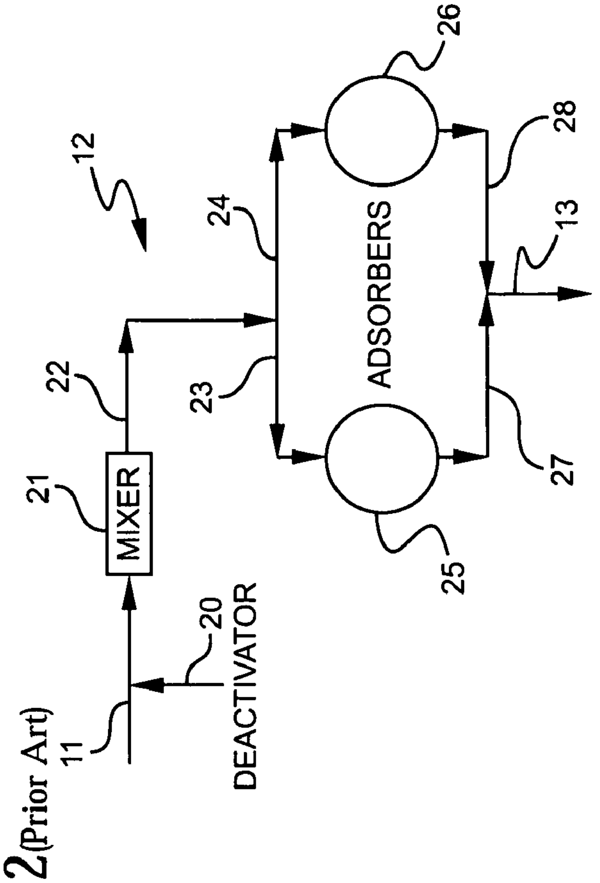
FIG. 2 (Prior Art)
FIG. 2 shows a flow sheet for the adsorber arrangement for the HDPE process of FIG. 1.

FIG. 2 shows unit 12 to comprise two downward flow adsorbers 25 and 26 (insulated or un-insulated) arranged for parallel operation so that one such adsorber can be in operation while the other adsorber is shut down for maintenance, replacement of its adsorbent bed, and the like. The single phase solution in line 11 has added thereto catalyst deactivator 20 to terminate the polymerization reaction, and the resulting single phase solution passed by way of line 22 into either of adsorbers 25 or 26 by way of lines 23 or 24, respectively. When passing through one of adsorbers 25 or 26, the single phase solution process fluid contacts and flows through the alumina bed (not shown) inside that adsorber for removal of catalyst and deactivator materials from the process fluid as aforesaid. The process fluid leaving the adsorbent bed is passed by way of either of lines 27 or 28 to line 13 for conduct to unit 14.

Figure 3:
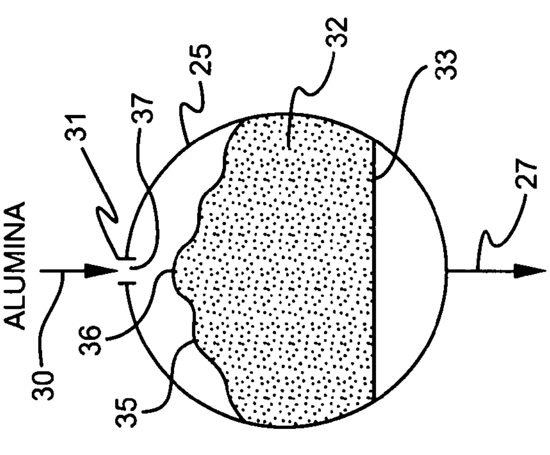
FIG. 3 (Prior Art)
FIG. 3 shows one of the adsorbers of FIG. 2 with a particulate bed therein.

FIG. 3 shows that when, for example, adsorber 25 was initially filled with alumina adsorbent 30, the particulate adsorbent was poured (gravity flow) through upper vessel nozzle 31 onto perforate screen 33, and allowed to build upwardly from screen 33 to the configuration it naturally forms under its natural angle of repose. This configuration is a bed 32 characterized by an upper surface 35 in the configuration of an inverted conical pile. Surface 35 extends upwardly toward nozzle 31 at the natural angle of repose for the particles that make up bed 32. Peak 36 of surface 35 of bed 32 approaches nozzle 31, but is below, and spaced from, the outlet opening 37 of that nozzle. Bed 32 can contain one or more materials, mixed or in layers.

Figure 4:
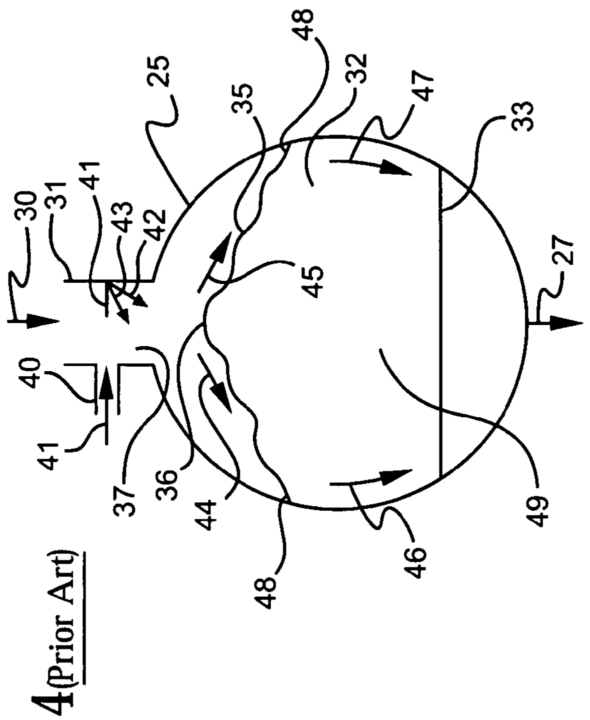
FIG. 4 (Prior Art)
FIG. 4 shows the flow of process fluid internally of the adsorber of FIG. 3 that leads up to channeling of process fluid in the bed.

FIG. 4 shows adsorber 25 of FIG. 3 after adsorbant flow 30 is stopped, and process fluid 41 introduced into the interior of vessel 25 when that vessel is put into operation in the polymerization process of FIG. 1. FIG. 4 shows that nozzle 31 is upstanding with its long axis essentially vertical, and that it carries a transversely extending inlet conduit 40 for passing process fluid 41 into nozzle 31. Process fluid 41 thus enters nozzle 31 at an angle that is transverse (90 degrees in FIG. 4) to the long axis of nozzle 31. Thus, fluid 41 must impinge on an interior wall of nozzle 31 in order to be redirected downwardly toward nozzle opening 37 and, ultimately, to bed 32. This causes a mal-distribution of fluid 41 as shown by arrows 42 and 43, the result being that a majority of fluid 41 flows toward the outer periphery 48 of bed 32. This result is enhanced by the spherical curvature of the walls of vessel 25. Thus, fluid 41 is concentrated at outer volumes 46 and 47 of bed 32 thereby channeling most of fluid 41 through these volumes, and leaving the central volume 49 either underutilized or not used at all for adsorption purposes. Channeling of fluid 41 through outer volumes 46 and 47 can cause pressure changes in those volumes sufficient to cause two-phasing of fluid 41 in those volumes. This can cause solid polymer deposition in those volumes which, in turn, can cause new channeling of fluid 41 in other, more inner volumes of bed 32 until bed 32 is essentially plugged, even in central portion 49, and requires shut down of vessel 25 and replacement of plugged bed 32.

The non-uniform distribution of fluid 41 inside nozzle 31 as shown by arrows 42 and 43, compounded by the uneven (not flat) configuration of upper surface 35 of bed 32 and the round configuration of vessel 25 all work together to encourage undesired channeling 46 and 47 (and, ultimately, two-phasing) near the outer edge (periphery) 48 of bed 32. This invention combats this combination of negatives.

Figure 5:
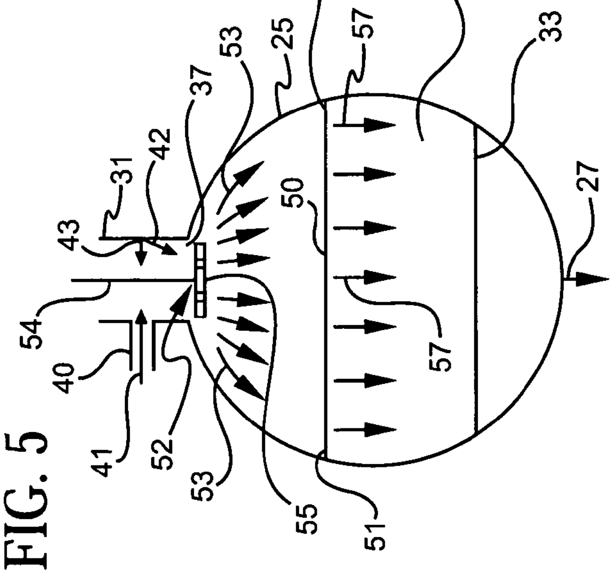
FIG. 5 shows the flow of process fluid internally of the adsorber of FIG. 3 when this invention is employed in that absorber.

FIG. 5 shows the arrangement of FIG. 4 after the implementation of one embodiment within this invention.

The first step of this invention is to substantially flatten (level) the uneven upper surface 35 of bed 32 as shown by new upper bed surface 50. Surface 50 does not have to be exactly or completely flat or level in order to obtain the benefits of this invention. Surface 50 just must be substantially more level so that the configuration of the upper surface of bed 32, unlike the configuration shown in FIG. 4, does not substantially favor the flow of fluid 41 toward the newly formed periphery 51 of bed 32.

Leveling of surface 35 of FIG. 4 to approach surface 50 can be done in any manner desired. It can be done pneumatically and/or mechanically, or any other way obvious to those skilled in the art. For example, an air stream can be imposed on surface 35, particularly peak 36 to force particles away from peak 36 to form new periphery 51. Alternatively, a rotating screed such as that used in finishing a newly poured concrete surface could be imposed on peak 36 to wear down the peak by moving particles outwardly there from to form new periphery 51 that is higher inside vessel 25 than original periphery 48.

The second step of this invention employs a mechanical flow distributor 52 to redirect randomly oriented fluid 41 flows 42 and 43 into more uniformly dispersed flows 53. Flows 53 are more evenly distributed across the entire upper surface 50 within periphery 51 thereby reducing the tendency of fluid 41 to collect near periphery 51 due to the rounded wall configuration of adsorber 25.

Figure 6:
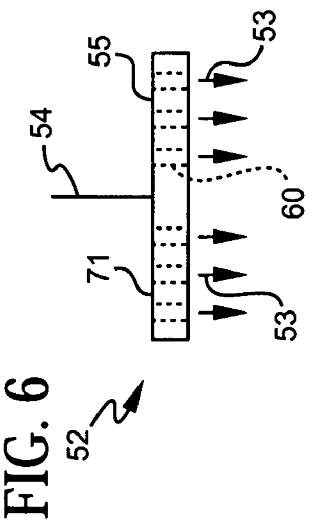
FIGS. 6 through 13 show various embodiments of flow distributors that can be employed in the practice of this invention.
Figure 7:
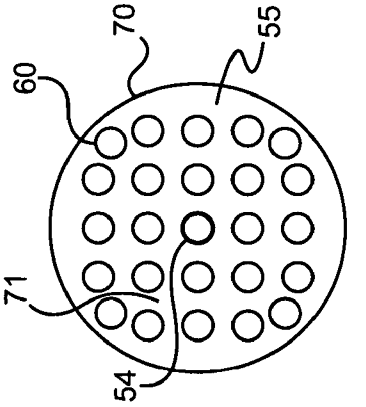

In the embodiment of FIG. 5 flow distributor 52 is in the configuration of an essentially planar perforate plate 55 supported by rod 54 in or near opening 37. This is shown in better detail in FIGS. 6 and 7. In FIGS. 6 and 7, plate 55 is shown to contain a plurality of apertures 60 through the full thickness thereof, and through which fluid 41 can uniformly flow as shown by arrows 53. In FIG. 7 plate 55 is shown to be round in its external configuration, but any other configuration, be it square, rectangular, triangular, or the like can be employed so long as uniform distribution of fluid 41 is obtained as shown in FIG. 5. Plate 55 can be any thickness and composition so long as it will maintain its configuration under the impingement of fluid 41 and not react chemically with that fluid. The transverse area of plate 55, as represented by the upper surface 71 of that plate including apertures 60, can vary widely, but will preferably be not significantly larger than the transverse, cross-sectional area of nozzle opening 37, and can be smaller than such cross-sectional area of opening 37 so long as a more even distribution of down falling fluid 41 is achieved.

It should be noted that rod 54 and plate 55 are essentially fixed in place. Reciprocation or rotation of either element would cause undesired turbulence in the flow of fluid 41, and detract from achieving the uniform flow achieved by this invention.

Figure 8:
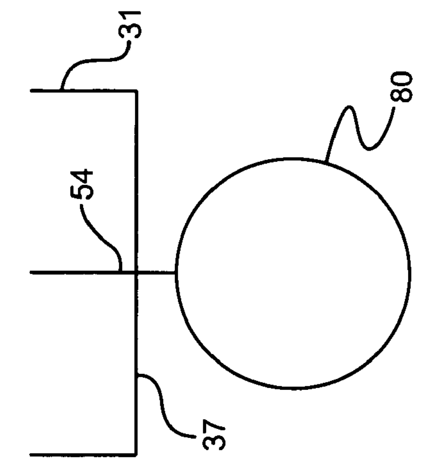

FIG. 8 shows one of many alternate embodiments that can be used as a flow distributor within this invention. In FIG. 8, the flow distributor configuration used is a sphere 80 supported on rod 54. Sphere 80, like plate 55 and other embodiments set forth hereinbelow, would be carried in or near, preferably just below nozzle opening 37 as shown in FIG. 5, and can be hollow or solid. A hemispherical or “less than spherical” distributor form would also cause undesired turbulence in the flow of fluid 41, and would not achieve the uniform flow results for fluid 41 of this invention. This premise applies as well to the embodiments of FIGS. 9-12 below.

Figure 9:
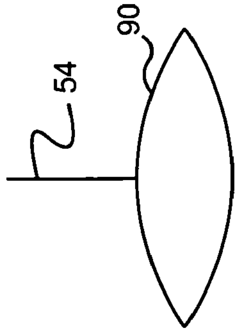

FIG. 9 shows another distributor embodiment in the form of a lenticular member 90 supported on rod 54 in the same relation to opening 37 (not shown) as shown for sphere 80 of FIG. 8.

Figure 10:
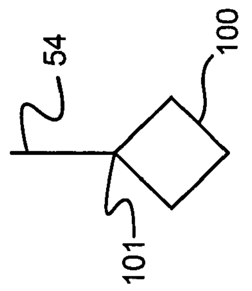

FIG. 10 shows another distributor embodiment in the form of a cube 100 carried by rod 54 with one edge 101 facing opening 37 (not shown) in the same spatial relation to that opening as sphere 80 of FIG. 8.

Figure 11:
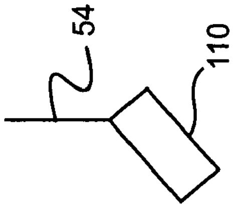

FIG. 11 shows a rectangular (rectilinear) form 110 carried by rod 54 with one edge 111 facing opening 37 (not shown) in the same spatial relation to that opening as sphere 80 of FIG. 8.

Figure 12:
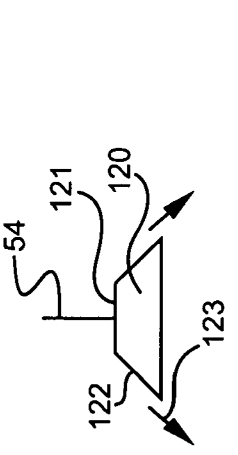

FIG. 12 shows yet another distributor in the form of a trapezoid 120 carried on its smaller face 121 by rod 54 so that sloping faces 122 of the trapezoid direct fluid 41 flow outwardly as shown by arrows 123.

Figure 13:
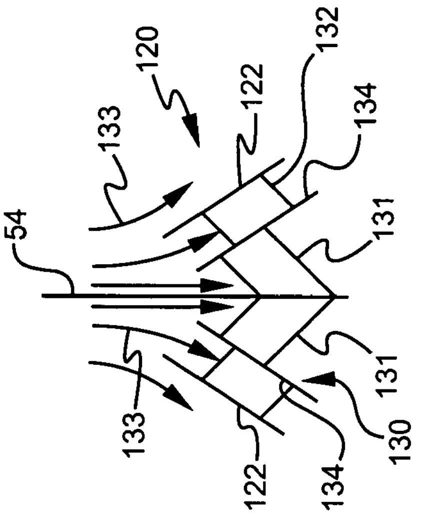

To provide for more even distribution with a trapezoidal form, a plurality of hollow trapezoids nested within one another can be employed so that the trapezoidal shaped distributor is, in effect, perforate and performs uniform fluid flow distribution similar to that shown for plate 55 (FIG. 5). This is shown in FIG. 13 wherein form 120 is shown to be hollow, topless, and bottomless. Trapezoidal faces 122 of form 120 have disposed within the hollow interior of form 120, nested, smaller, trapezoidal form 130 having faces 134. Internal faces 134 are carried spaced from rod 54 by means of spaced apart spacers 131 so that fluid can flow between faces 122 and 134 and between adjacent spacers 131. Similarly, faces 134 and 122 are spaced apart with spacers 132. Thus, fluid 41 can be evenly distributed over the outside of faces 122 and 134, and inside faces 134 adjacent rod 54, all as shown by arrows 133. All such faces are essentially smooth, as can be the case with the other embodiments here in above.

Figure 14:
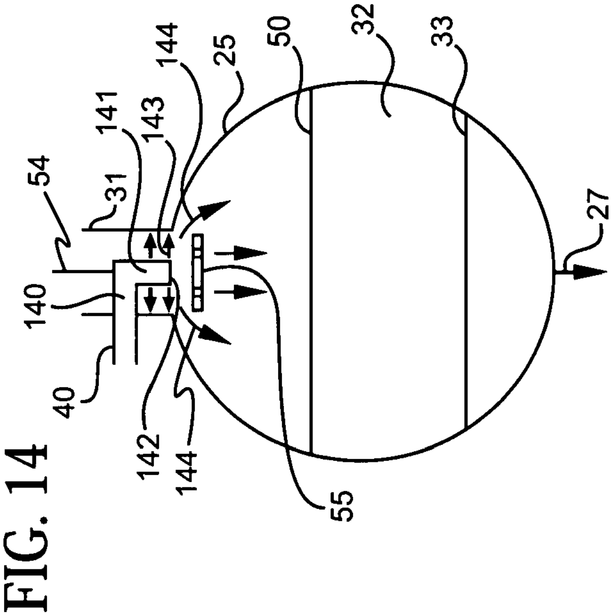
FIG. 14 shows the use a flow redirection member that can be employed in the practice of this invention.

FIG. 14 shows nozzle 31 to carry internally thereof a member 140 that is in fluid communication with conduit 40, member 140 carrying a downwardly extending, closed portion 141 that carries a plurality of perforations through which fluid 41 can flow. Thus, fluid 41 leaving conduit 40 and entering member 140 is redirected from its transverse flow direction into a new direction that is substantially parallel with the long axis of nozzle 31. Since end 142 of portion 141 is closed, fluid 41 leaves closed portion 141, and member 140, in a redirected direction that is once again substantially transverse to the long axis of nozzle 31 as shown by arrows 143. Fluid 41 then falls downwardly in nozzle 31, through opening 37 and, at least in part, on to the top surface of plate 55. This distributes fluid 41 evenly over the upper surface 50 of bed 32 as shown by arrows 144.

We claim:

1. In a method for operating a pressure vessel having a curvilinear configuration that contains a bed of particulate material, said bed having an uneven upper surface, wherein a fluid is introduced downwardly into said vessel through a nozzle, said nozzle having an opening of finite cross-sectional area, said nozzle being above said uneven upper surface, said fluid flowing into said nozzle being redirected in an angular direction toward said opening, the improvement comprising substantially flattening said upper surface of said bed before introducing said fluid into said nozzle, and employing a flow distributor in or near said nozzle opening said flow distributor being a plate having a finite periphery and a plurality of apertures there through to allow said fluid to pass through said plate as well as around said periphery, said plate having a surface area nearest said nozzle opening that is less than said cross-sectional area of said nozzle opening.

2. The method of claim 1 wherein said vessel contains an upper, middle, and lower section, said nozzle opening is disposed above and spaced from said upper surface of said bed, said fluid is allowed to flow through said bed and is recovered below said bed, said vessel is essentially spherical, and in operation said vessel contains process pressures of at least about 1,000 psig.

3. The method of claim 1 wherein said fluid flow is redirected at an acute angle up to a 90 degree angle.

4. The method of claim 1 wherein said uneven surface is flattened using at least one of pneumatic and mechanical means.

5. The method of claim 1 wherein said plate has a periphery that is essentially round.

* * * * *